May 26, 1953  I. V. THORNTON  2,639,930
CURTAIN ROD AND BRACKET THEREFOR
Filed Dec. 22, 1949
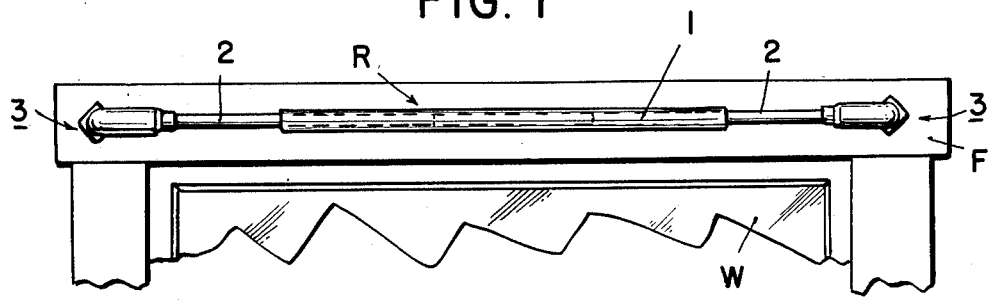
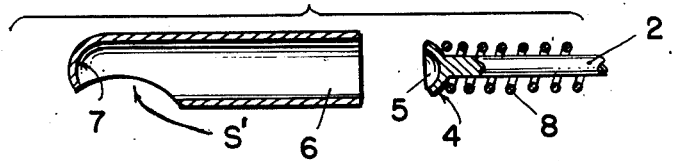
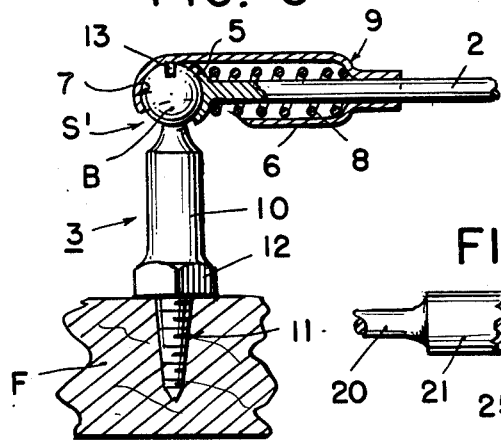
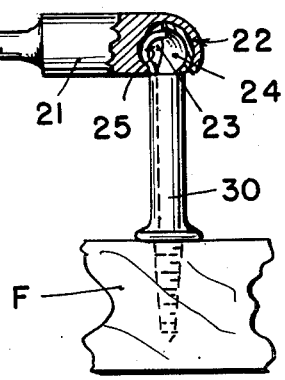
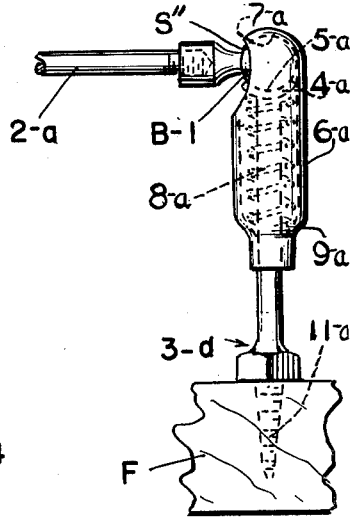
Inventor:
ISAIAH VERNON THORNTON,
By *Ogle R. Singleton*
Attorney Patented May 26, 1953

2,639,930

UNITED STATES PATENT OFFICE 2,639,930

CURTAIN ROD AND BRACKET THEREFOR

Isaiah Vernon Thornton, Ogden, Utah

Application December 22, 1949, Serial No. 134,455

3 Claims. (Cl. 287—90)

My invention consists in a new and useful improvement in curtain rods and brackets therefor and is intended more particularly for hanging curtains for windows and doorways. The novel and useful feature of my device is the improved ball-and-socket joint which is provided whereby the rod can be removably attached to a pair of brackets mounted on the frame of the window or doorway. My device provides means for hanging a curtain upon a telescopic rod adjustable for curtains of different widths, which can be readily removably mounted upon a pair of brackets screwed into the frame. While I have illustrated in the drawing and have hereinafter fully described several forms of my improved device, the novel feature common to all of the forms is the resilient means provided for effecting locking co-action of the rod and brackets by means of my improved ball-and-socket joint.

It is to be distinctly understood that I do not consider my invention to be limited to its several specific embodiments shown and described and that I refer for its scope to the claims appended hereto.

In the drawing:

Fig. 1 is a side elevation of my improved rod and brackets applied to a window or door frame.

Fig. 2 is an enlarged, exploded, longitudinal section of a spring socket before its application to the rod.

Fig. 3 is a top plan, partly in section, of the ball-and-socket joint of the rod and the bracket.

Fig. 4 is a view, similar to Fig. 3, of a modified form of joint.

Fig. 5 is a view, similar to Figs. 3 and 4, of another modified form of joint.

As illustrated in the drawing, my improved rod R comprises a middle tubular portion 1 and solid end portions 2, slidable in the portion 1, each having a sleeve to receive therein a ball B carried by a bracket 3 mounted in the frame F of the window W. The portion 2 (Fig. 2) has its outer end formed as an enlarged head 4 having a substantially hemi-spherical seat 5. A tubular sleeve 6 has a concave seat 7 formed at its outer end and receives therein the head 4 and an expansion coil spring 8 on the rod portion 2 which is confined between the head 4 and a shoulder 9 (Fig. 3) formed by spinning the inner end of the sleeve 6 about the portion 2 after the head 4 and the spring 8 have been inserted into the sleeve 6. The spring 8 biases the sleeve 6 toward the portion 2. The ball B is received through an opening S' in the sleeve 6 and is gripped between the seats 5 and 7 by action of the spring 8. The ball B is mounted on a shank 10 of the bracket 3 which has a suitable threaded tang 11 for screwing the bracket 3 into the frame F by means of a wrench applied to a hex-head 12 on the shank 10 or by a screw-driver inserted into a slot 13 in the top of the ball B.

The modified form of joint shown in Fig. 4 comprises a rod 2–a and a bracket 3–a. The rod 2–a has screwed on its end a ball B–1. The bracket 3–a has its outer end formed as an enlarged head 4–a having a substantially hemi-spherical seat 5–a. A tubular sleeve 6–a has a concave seat 7–a formed at its outer end and receives therein the head 4–a and an expansion coil spring 8–a on the bracket 3–a, which is confined between the head 4–a and a shoulder 9–a formed by spinning the inner end of the sleeve 6–a about the bracket 3–a after the head 4–a and the spring 8–a have been inserted into the sleeve 6–a. The spring 8–a biases the sleeve 6–a toward the bracket 3–a. The ball B–1 is received through an opening S'' in the sleeve 6–a and is gripped between the seats 5–a and 7–a by action of the spring 8–a. The bracket 3–a has a threaded tang 11–a for screwing the bracket 3–a into the frame of the window.

The modified form of joint shown in Fig. 5 comprises a rod portion 20 and a bracket 30. The portion 20 has on its outer end a socket 21 having a concave seat 22 and a reduced throat 23. The bracket 30, suitable for mounting in frame F, has a substantially hemi-spherical head 24 and a resilient convex finger 25 which, when compressed, allows the head 24 to enter the socket 21 through the throat 23, and, when expanded, causes head 24 to engage in the seat 22.

Having described the structural details of my device, I will now describe its use and operation. When the brackets 3 have been mounted in the frame F and the curtain has been mounted on the rod R, the portions 2 are mounted on the brackets 3 by sliding the sleeves 6 to compress the springs 8 and space the seats 5 and 7 apart which are slipped over the balls B of the brackets 3.

It is obvious that the form of the device shown in Fig. 4 is assembled by sliding the sleeves 6–a on the brackets 3–a for insertion of the balls B–1 into the sleeve 6–a through the openings S, and that the form of the device shown in Fig. 5 is assembled by slipping the sockets 21 over the heads 24 and yielding fingers 25 to be received in the seats 22.

Having described my invention, what I claim is:

1. In a device for hanging curtains, the combination of two elements comprising a rod to support the curtain and a bracket to support the rod; and means for removably connecting said elements, comprising co-acting members mounted on said elements, respectively, one of said members being a ball, and the other one of said members being a sleeve slidable on one end of the element upon which it is mounted, and having an opening through which said ball can enter said sleeve, and an expansion spring confined between said end and said sleeve to bias said sleeve toward the element upon which said sleeve is mounted, to engage the inserted ball between said sleeve and said end of the element upon which said sleeve is mounted.

2. In a device for hanging curtains, the combination of a rod to support the curtain; a bracket to support the rod; a ball mounted on said bracket; a sleeve slidably mounted on one end of said rod receiving said ball; and an expansion spring confined between said end and said sleeve to bias said sleeve toward said rod for effecting locking co-action of said ball and said sleeve.

3. In a device for hanging curtains, the combination of a rod to support the curtain; a bracket to support said rod; a ball mounted on said rod; a sleeve slidably mounted on one end of said bracket receiving said ball; and an expansion spring confined between said end and said sleeve to bias said sleeve toward said bracket for effecting locking co-action of said ball and said sleeve.

ISAIAH VERNON THORNTON.

References Cited in the file of this patent

UNITED STATES PATENTS

| Number | Name | Date |
|---|---|---|
| 830,183 | Small et al. | Sept. 4, 1906 |
| 1,035,989 | Miller | Aug. 20, 1912 |
| 1,254,199 | Brice et al. | Jan. 22, 1918 |
| 1,265,445 | Hagen | May 7, 1918 |
| 1,337,138 | Kaps | Apr. 13, 1920 |
| 1,492,376 | Klages | Apr. 29, 1924 |
| 1,868,891 | Faudi | July 26, 1932 |

FOREIGN PATENTS

| Number | Country | Date |
|---|---|---|
| 453,953 | France | Apr. 17, 1913 |